United States Patent [19]
Allemang et al.

[11] 3,789,580
[45] Feb. 5, 1974

[54] REMOVAL OF PHOSGENE FROM AN ESSENTIALLY ANHYDROUS GAS STREAM

[75] Inventors: Arnold A. Allemang, Stade, Germany; Howard J. Bachtel, Lake Jackson, Tex.

[73] Assignee: The Dow Chemical Company, Midland, Mich.

[22] Filed: Aug. 17, 1972

[21] Appl. No.: 281,527

[52] U.S. Cl. ................................. 55/71, 423/240
[51] Int. Cl. ............................................ B01d 53/04
[58] Field of Search ........... 55/71, 74, 387; 423/240

[56] References Cited
UNITED STATES PATENTS
3,376,113   4/1968   Frevel et al. ..................... 423/240
3,411,867   11/1968   Beech et al. ..................... 423/240

*Primary Examiner*—Charles N. Hart
*Attorney, Agent, or Firm*—S. S. Grace

[57] ABSTRACT

A method for removing phosgene from an essentially anhydrous gas stream which involves contacting such a stream with activated alumina at a temperature of from 110°C to 200°C under essentially anhydrous conditions. This method is particularly useful in removing phosgene from chlorinated hydrocarbon gas streams also containing acid gas impurities.

4 Claims, No Drawings

REMOVAL OF PHOSGENE FROM AN ESSENTIALLY ANHYDROUS GAS STREAM

BACKGROUND OF THE INVENTION

Phosgene is a highly poisonous gas which frequently occurs as a contaminant in other gas streams, particularly in streams of chlorinated hydrocarbons. The presence of phosgene in chlorinated hydrocarbon even in a very small quantity constitutes a serious health hazard.

U.S. Pat. No. 3,376,113 (Frevel et al.) disclosed a method of removing phosgene from gas streams involving the catalytic hydrolysis of phosgene wherein the gas stream is passed over an alkaline active alumina at elevated temperature. However, while this is an effective method of removing phosgene, it does require the presence or addition of water to the gas stream being treated. This is undesirable with respect to gas streams which contain acid gas impurities such as hydrogen chloride. The water dissolved in any condensed chlorinated hydrocarbon combined with the acid gas impurity produces a highly corrosive environment resulting in eventual deterioration of equipment employed in the process.

It is an object of the present invention to provide a method for removing phosgene from gas streams under essentially anhydrous or dry conditions.

THE INVENTION

The method of the present invention comprises contacting an essentially anhydrous gas stream containing phosgene with activated alumina at a temperature of from about 110°C to about 200°C under essentially anhydrous conditions. It has been found that under these conditions the phosgene reacts with the activated alumina to remove the phosgene from the gas stream. This method is particularly applicable for removing phosgene impurities, e.g. 50–200 parts per million, from chlorinated hydrocarbon gas streams, e.g., methyl chloride, which also contain acid gas impurities, e.g., hydrogen chloride. Because no water is required to be present for the removal operation the corrosive environment is not formed.

The term "activated alumina" refers to a variety of high surface area (about 20 to 300 or more square meters per gram), active alumina ($Al_2O_3$) compositions. A preferred activated alumina is one which is made by heating aluminum oxide monohydrate ($Al_2O_3 \cdot H_2O$) to at least about 300°C to remove at least a part of the water of crystallization to reorient the crystalline structure to produce gamma alumina.

In accordance with the present invention the gas stream containing phosgene is contacted with the activated alumina at the temperature of from about 110°C to about 200°C under essentially anhydrous conditions. That is the gas stream contains essentially no water, i.e., less than 100 parts per million, and the contacting of the gas stream of the activated alumina is carried out without the introduction of water into the system. The activated alumina is predried to remove any water prior to contact with the gas stream. The contact is effectively carried out by passing the gas stream containing phosgene through a bed of the activated alumina. The length of the bed and the flow rate of the gas stream can be adjusted to provide the required contact time for removal of essentially all the phosgene impurity. Contact times on the order of above 0.6 min. to 0.12 min. is satisfactory.

The following example is illustrative of the present invention.

A 4 liter cylinder was charged with the gamma type alumina previously referred to, ¼ by 8 mesh (U.S. Standard Sieve Series) that had been oven dried at 150°C. The product stream from the thermochlorination of methane which contained 50–150 parts per million phosgene and hydrogen chloride impurity (although the product stream has been previously scrubbed to remove HCl with sodium hydroxide) was preheated to 150°C. The gaseous stream contained less than 10 parts per million water. The reactor temperature and pressure were maintained at 150°C and 120 psig with a flow rate of 1.66 ft.$^3$/min. Water concentration in the effluent was the same as the concentration in the feed stream. After 39,000 ft.$^3$ had been treated the phosgene in the effluent was less than 10 parts per million. Carbon deposits, indicative of a reaction between the phosgene and the activated alumina, were noted on the surface of the activated alumina bed.

In like manner other gas streams containing phosgene can be treated to remove the phosgene without the addition of water.

What is claimed is:

1. A method for removing phosgene from an essentially anhydrous gas stream which comprises contacting such stream with activated alumina at a temperature of from about 110°C to about 200°C under essentially anhydrous conditions.

2. The method of claim 1 wherein the anhydrous gas stream is chlorinated hydrocarbon gas stream also containing an acid gas.

3. The method of claim 1 wherein the anhydrous gas stream is a methyl-chloride gas stream containing hydrogen chloride and phosgene.

4. The method of claim 1 wherein the activated alumina is made by heating $Al_2O_3 \cdot H_2O$ to at least about 300°C to remove at least a part of the water of crystallization to reorient the crystalline structure to produce gamma alumina.

* * * * *